No. 775,245. PATENTED NOV. 15, 1904.
J. A. PLAYER.
FLUE EXPANDER.
APPLICATION FILED JULY 7, 1904.
NO MODEL.
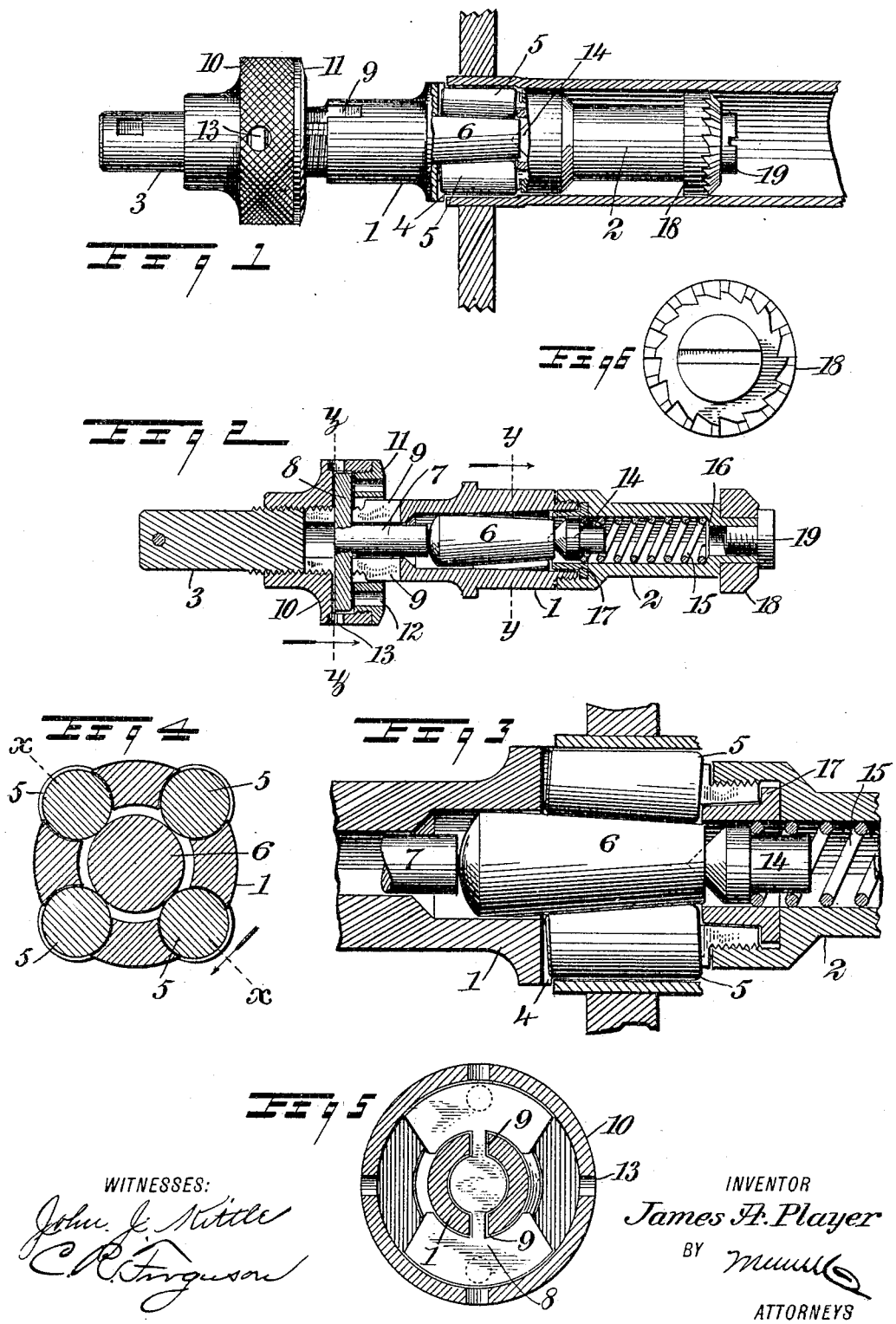
WITNESSES:
INVENTOR
James A. Player
BY
ATTORNEYS No. 775,245. Patented November 15, 1904.

UNITED STATES PATENT OFFICE.

JAMES ARTHUR PLAYER, OF CLEBURNE, TEXAS, ASSIGNOR OF ONE-HALF TO SAMUEL D. KINNEY AND WILSON E. SYMONS, OF CLEBURNE, TEXAS.

FLUE-EXPANDER.

SPECIFICATION forming part of Letters Patent No. 775,245, dated November 15, 1904.

Application filed July 7, 1904. Serial No. 215,648. (No model.)

*To all whom it may concern:*

Be it known that I, JAMES ARTHUR PLAYER, a citizen of the United States, and a resident of Cleburne, in the county of Johnson and State of Texas, have invented a new and Improved Flue-Expander, of which the following is a full, clear, and exact description.

This invention relates to improvements in tools for expanding boiler-flues in flue-sheets, the object being to provide a tool of novel construction adapted to be operated by a suitable motor and by means of which a flue may be very quickly expanded to a tight fit in the flue-sheet opening and parallel with the wall of the opening.

I will describe a flue-expander embodying my invention and then point out the novel features in the appended claims.

Reference is to be had to the accompanying drawings, forming a part of this specification, in which similar characters of reference indicate corresponding parts in all the figures.

Figure 1 is a side view with a portion broken away of a flue-expander embodying my invention. Fig. 2 is a longitudinal section thereof. Fig. 3 is a section on the line $x$ $x$ of Fig. 4. Fig. 4 is a section on the line $y$ $y$ of Fig. 2. Fig. 5 is a section on the line $z$ $z$ of Fig. 2, and Fig. 6 is an end view of a scale-cutter employed.

The body of the expander consists of two tubular members 1 2, which have screw-thread engagement, as clearly shown in the drawings. It is to be understood, however, that the tubular body may be made of a single piece, although the two-part body may be preferred for convenience in assembling the parts therein. The member 1 of the body has a shank extension 3, to which a flexible shaft or the like operated by an air-motor or other motor may be attached. The body is provided with a plurality of longitudinal slots 4, which open outward, and arranged in the slots are longitudinally-tapered expanding-rollers 5, which are forced outward by a pressure-roller 6, which is tapered reversely to the rollers 5, so that said expanding-rollers will be moved outward in substantially horizontal planes to force the flue tightly against the wall of an opening in the flue-sheet, as indicated in Fig. 1.

A plunger 7 is movable in the body and is designed to engage with the outer end of the roller 6, and this plunger has a cross-head 8, which extends outward through opposite slots 9, formed in the body, and engages in an adjusting-nut 10, having screw-thread engagement with the body. The nut 10 is made cup-shaped to receive the cross-head, which is secured in place by means of an exteriorly-threaded collar 11, engaging with the interior thread of the nut 10, and for convenience in separating the parts the collar 11 is provided with holes 12, in any one of which a nail or rod may be inserted to hold the collar while the nut is being turned off or on the same. The nut 10 is provided in its periphery with a plurality of perforations 13 to receive a rod for turning the nut. A spanner-wrench may also be employed for holding the collar or turning the nut.

At its inner end the roller 6 has a slight depression to receive the pointed end of a centering-pin 14, which has a shank portion extended into a coiled spring 15, arranged in the member 2 of the body and engaging at its inner end against a shoulder 16, formed in said member 2. This spring not only holds the centering-pin in connection with the roller 6, but when the nut 10 is moved outward the said spring will force the roller 6 longitudinally outward, permitting the expanding-rollers to move inward and free themselves from the flue. The pin is guided by a sleeve 17, arranged at the end of the member 2 of the body and projected into the member 1. Instead of a separate sleeve, however, the end of the member 2 may be extended to form a guide.

On the end of the body is a tapered reamer 18 for removing scale, rust, and the like from the end of the flue when the tool is first inserted, thus providing a smooth surface for the expanding-rollers to act upon. This reamer is removably held in place by means of a screw 19.

In the operation the tool is to be inserted in the flue while rotating, so that the reamer will perform the service above mentioned, and when the expanding-rollers are in position in the end of the flue they may be gradually moved outward by an inward turning of the nut 10. Of course the tool will be in continuous rotation until the expanding is completed.

Having thus described my invention, I claim as new and desire to secure by Letters Patent—

1. An expanding-tool comprising a tubular body having longitudinal outwardly-opening slots, expanding-rollers arranged in said slots, a pressure-roller with which the expanding-rollers engage, a nut movable on the body, a plunger operated by said nut against the outer end of the pressure-roller, and a spring-pressed centering-pin engaged with the inner end of said pressure-roller.

2. A flue-expander comprising a tubular body, radially-movable rollers arranged in the body, a pressure-roller for moving said first-named rollers outward, means for imparting longitudinal movement to the pressure-roller, a centering-pin engaging with the inner end of the pressure-roller, and a spring in the body engaging with said centering-pin.

3. A flue-expander comprising a tubular body having longitudinal slots, expanding-rollers arranged in said slots, the said body being also provided with slots outward of the first-named slots, a cross-head extended through said outer slots, a nut movable on the body and into which said cross-head extends, a plunger on the cross-head, a pressure-roller arranged between the first-named rollers and engaged by said plunger, and a yielding centering-pin engaging with the inner end of said pressure-roller.

4. A flue-expander comprising a tubular body, expanding-rollers arranged in the body, means for moving said rollers outward, a yielding centering-pin engaging with the inner end of the expanding-roller and a reamer on the inner end of the body adapted to smooth the interior of a tube prior to the entrance of the expanding-rollers.

In testimony whereof I have signed my name to this specification in the presence of two subscribing witnesses.

JAMES ARTHUR PLAYER.

Witnesses:
T. J. JOPLIN,
W. G. HODGE.